United States Patent [19]

Tank et al.

[11] Patent Number: 5,468,268
[45] Date of Patent: Nov. 21, 1995

[54] METHOD OF MAKING AN ABRASIVE COMPACT

[76] Inventors: Klaus Tank, 9 Warbleton Avenue, Essexwold, Johannesburg; Alan R. Jarvis, 320 Suncrest, Isipingo Road, Bellevue East, Johannesburg; Aulette Stewart, 45 Arend Avenue, Randburg, all of South Africa

[21] Appl. No.: 249,939

[22] Filed: May 27, 1994

[30] Foreign Application Priority Data

May 27, 1993 [ZA] South Africa .............. 93/3717

[51] Int. Cl.$^6$ .................................. B24D 18/00
[52] U.S. Cl. .................. 51/293; 51/295; 51/307
[58] Field of Search ............... 51/293, 295, 307

[56] References Cited

U.S. PATENT DOCUMENTS

| | | | |
|---|---|---|---|
| 3,136,615 | 10/1960 | Bovenkerk et al. | 51/307 |
| 3,233,988 | 5/1964 | Wentorf, Jr. et al. | 51/307 |
| 3,743,489 | 7/1973 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 4,247,304 | 1/1981 | Morelock | 51/295 |
| 4,311,490 | 1/1982 | Bovenkerk et al. | 51/307 |
| 4,604,106 | 8/1986 | Hall et al. | 51/293 |
| 4,647,546 | 3/1987 | Hall, Jr. et al. | 51/307 |
| 4,861,350 | 8/1989 | Phaal et al. | 51/307 |
| 5,010,043 | 4/1991 | Ringwood | 51/307 |
| 5,011,514 | 4/1991 | Cho et al. | 51/295 |

*Primary Examiner*—Deborah Jones
*Attorney, Agent, or Firm*—Scully, Scott, Murphy & Presser

[57] ABSTRACT

The invention provides a method of making an abrasive compact using conventional compact synthesis conditions. The method is characterized by the use of an ultra-hard abrasive particle mass comprising at least 25 percent by mass of ultra-hard abrasive particles having an average particle size in the range 10 to 100 microns, and consisting of particles having at least three different average particle sizes, and at least 4 percent by mass of ultra-hard abrasive particles having an average particle size of less than 10 microns. The abrasive compact is preferably a diamond compact.

11 Claims, 1 Drawing Sheet

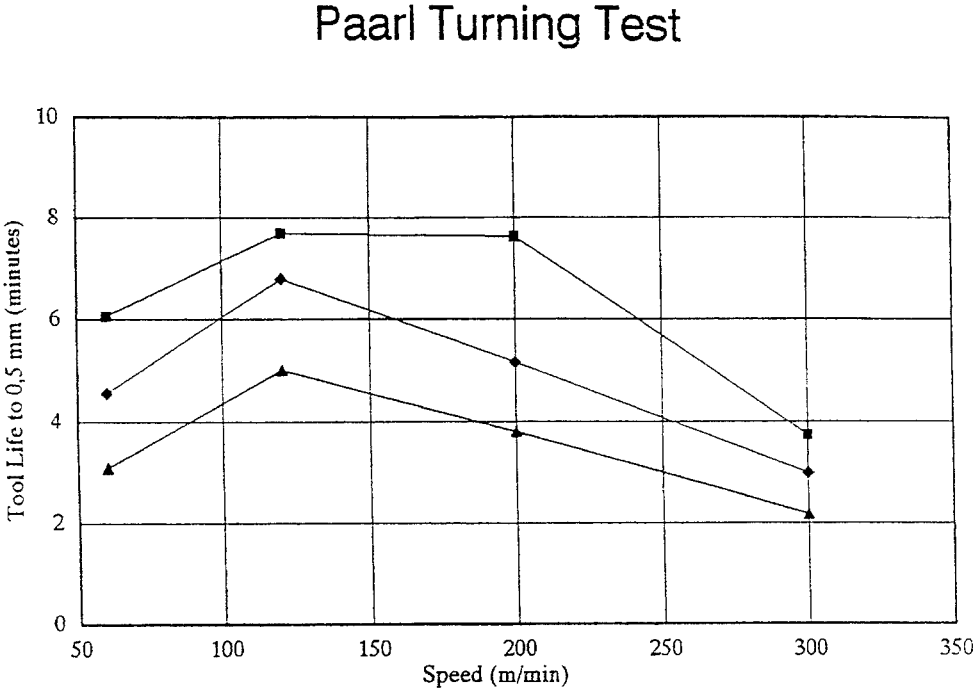
Paarl Turning Test
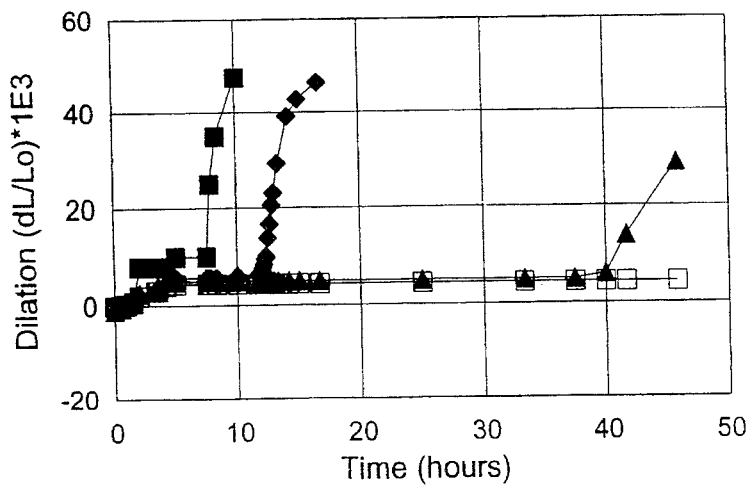

METHOD OF MAKING AN ABRASIVE COMPACT

BACKGROUND OF THE INVENTION

This invention relates to a method of making an abrasive compact.

Abrasive compacts are used extensively in cutting, milling, grinding, drilling and other abrasive operations. Abrasive compacts consist of a mass of diamond or cubic boron nitride particles bonded into a coherent, polycrystalline conglomerate. The abrasive particle content of abrasive compacts is high and there is generally an extensive amount of direct particle-to-particle bonding. Abrasive compacts are generally made under elevated temperature and pressure conditions at which the abrasive particle, be it diamond or cubic boron nitride, is crystallographically stable.

Abrasive compacts tend to be brittle and in use they are frequently supported by being bonded to a cemented carbide substrate or support. Such supported abrasive compacts are known in the art as composite abrasive compacts. Composite abrasive compacts may be used as such in a working surface of an abrasive tool.

Examples of composite abrasive compacts can be found described in U.S. Pat. Nos. 3,745,623, 3,767,371 and 3,743,489.

Composite abrasive compacts are generally produced by placing the components, in particulate form, necessary to form an abrasive compact on a cemented carbide substrate. This unbonded assembly is placed in a reaction capsule which is then placed in the reaction zone of a conventional high pressure/high temperature apparatus. The contents of the reaction capsule are subjected to suitable conditions of elevated temperature and pressure.

U.S. Pat. No. 4,861,350 describes a tool component comprising an abrasive compact bonded to a cemented carbide support in which the abrasive compact has two zones which are joined by an interlocking, common boundary. The one zone provides the cutting edge or point for the tool component, while the other zone is bonded to the cemented carbide support. In one embodiment of the tool component, the zone which provides the cutting edge or point has ultra-hard abrasive particles which are finer than the ultra-hard abrasive particles in the other zone. There is no disclosure of using a mixture of ultra-hard abrasive particles of different particle size.

U.S. Pat. No. 4,311,490 describes an abrasive compact wherein the bonded abrasive particles comprise a coarse layer and a fine layer. Again, the use of a mixture of abrasive particles of different particle size is not disclosed.

U.S. Pat. No. 4,604,106 describes a composite diamond abrasive compact comprising at least one layer of diamond crystals and pre-cemented carbide pieces which have been pressed under severe heat and pressure to create a composite polycrystalline material wherein polycrystalline diamond and pre-cemented carbide pieces are interspersed in one another. In one embodiment, a mixture of diamond particles is used, 65 percent of the particles being of the size 4 to 8 microns and 35 percent being of the size 0.5 to 1 micron.

U.S. Pat. No. 5,011,514 describes a thermally stable diamond compact comprising a plurality of individually metal-coated diamond particles wherein the metal coatings between adjacent particles are bonded to each other forming a cemented matrix. Examples of the metal coating are carbide formers such as tungsten, tantalum and molybdenum. The individually metal-coated diamond particles are bonded under diamond synthesis temperature and pressure conditions. The patent further discloses mixing the metal-coated diamond particles with uncoated smaller sized diamond particles which lie in the interstices between the coated particles. The smaller particles are said to decrease the porosity and increase the diamond content of the compact. Examples of bimodal compacts, i.e. two different particle sizes, and trimodal compacts, three different particles sizes, are described.

SUMMARY OF THE INVENTION

According to the present invention, a method of making an abrasive compact which includes the step of subjecting a mass of ultra-hard abrasive particles to conditions of elevated temperature and pressure suitable for producing an abrasive compact, is characterized by the mass comprising at least 25 percent by mass of ultra-hard abrasive particles having an average particle size in the range 10 to 100 microns and consisting of particles having at least three different average particle sizes and at least 4 percent by mass of ultra-hard abrasive particles having an average particle size of less than 10 microns.

The invention further provides an abrasive compact produced by this method and the use of such a compact as a tool insert in the drilling, turning or cutting of a substrate.

BRIEF DESCRIPTION OF THE DRAWINGS

FIGS. 1 and 2 illustrate graphically comparative tests carried out using a compact of the invention and prior art compacts.

DESCRIPTION OF EMBODIMENTS

The ultra-hard abrasive particles may be diamond or cubic boron nitride, but are preferably diamond particles.

The ultra-hard abrasive particle mixture will be subjected to known temperature and pressure conditions necessary to produce an abrasive compact. These conditions are typically those required to synthesize the abrasive particles themselves. Generally, the pressures used will be in the range 40 to 70 kilobars and the temperatures used will be in the range 1300° C. to 1600° C.

The abrasive compact which is produced by the method of the invention will. generally and preferably have a binder present. The binder will preferably be a catalyst/solvent for the ultra-hard abrasive particle used. Catalyst/solvents for diamond and cubic boron nitride are well known in the art. In the case of diamond, the binder is preferably cobalt, nickel, iron or an alloy containing one or more of these metals.

When a binder is used, particularly in the case of diamond compacts, it may be caused to infiltrate the mass of abrasive particles during compact manufacture. A shim or layer of the binder may be used for this purpose. Alternatively, and preferably, the binder is in particulate form and is mixed with the mass of abrasive particles. The binder will typically be present in an amount of 10 to 25 percent by mass in the abrasive compact produced.

The abrasive compact, particularly for diamond compacts, will generally be bonded to a cemented carbide support or substrate forming a composite abrasive compact. To produce such a composite abrasive compact, the mass of abrasive particles will be placed on a surface of a cemented carbide body before it is subjected to the elevated temperature and pressure conditions necessary for compact manufacture. The cemented carbide support or substrate may be any known in the art such as cemented tungsten carbide, cemented tantalum carbide, cemented titanium carbide, cemented molybdenum carbide or mixtures thereof. The binder metal for such carbides may be any known in the art such as nickel, cobalt, iron or an alloy containing one or more of these metals. Typically, this binder will be present in an amount of 10 to 20 percent by mass, but this may be as low as 6 percent by mass. Some of the binder metal will generally infiltrate the abrasive compact during compact formation.

The method of the invention is characterized by the abrasive particle mixture which is used. The mixture contains at least 4 types of abrasive particles differing from each other in their average particle size. The major amount of the particles will be close to the specified size, although there will be a limited number of particles above and below the specified size. The peak in the distribution of the particles will have the specified size. Thus, for example, if the average particle size is 50 microns, there will be some particles which are larger and some particles in the mix which are smaller than 50 microns, but the major amount of the particles will be at approximately 50 microns in size and the peak in the distribution will be 50 microns. The use of the range of particles provides both coarse and fine particles allowing for close packing and minimizing of binder pool formation when a binder is present. The particles are preferably all uncoated.

In the characterizing abrasive particle mixture of the invention, at least 25 percent of the abrasive particles will have an average particle size in the range 10 to 100 microns, and will consist of at least three types of abrasive particle differing only in their average particle size. An example of such an abrasive particle mix is as follows (the percentages being percentages by mass of the entire abrasive particle mass):

25 to 50 microns—30 to 70 percent 15 to 24 microns—15 to 25 percent 8 to 14 microns—5 to 15 percent The smallest abrasive particles in the characterizing mixture will have an average particle size of less than 10 microns, preferably an average particle size in the range 2 to 5 microns, and will be present in the mixture in an amount of at least 4 percent by mass. Generally, this smallest particle will not be present in an amount exceeding 12 percent by mass.

An embodiment of the invention will now be described. A diamond mass, mixed with cobalt powder (20 percent by mass of the mixture), was placed on a 20 percent cobalt cemented carbide substrate in the reaction capsule of a conventional high pressure/high temperature apparatus. This reaction capsule was placed in the reaction zone of the apparatus and subjected to a temperature of 1400° C. and a pressure of 50 to 60 kilobars and these elevated temperature and pressure conditions maintained for a period of 10 minutes. Recovered from the reaction capsule was a composite diamond compact consisting of a diamond compact bonded to a cemented carbide substrate. The cobalt was found to be uniformly and evenly distributed through the bonded diamond mass and no cobalt pools were observed.

The diamond mass used in producing this compact consisted of 65 percent by mass of 30 micron diamond, 20 percent by mass of 22 micron diamond, 10 percent by mass of 12 micron diamond and 5 percent by mass of 4 micron diamond, each micron size being an average particle size.

Similar composite diamond abrasive compacts were produced, save that the diamond particles used consisted of a single grade size of diamond only, namely 25 microns. In the case of the one compact, designated A, the cobalt was infiltrated into the diamond mass from a cobalt shim placed between the diamond mass and the cemented carbide substrate. In the case of the other compact, designated B, cobalt powder was mixed with the diamond mass.

The composite abrasive compact of the invention and the two prior art composite abrasive compacts were subjected to several tests and evaluations:

1. Turning tests—Four compacts of each type were evaluated in a performance test whereby four surface speeds were used and the resulting wear to 0,5 mm measured in minutes. The longer the time the better the compact. The results obtained are set out graphically in FIG. 1. It will be noted that the abrasive compact produced by the invention, and designated quadmodal, out-performed the two prior art compacts.

2. Shaper tests—Seven shaper tests were done on Norite Granite. It was noted that spalling of the compacts produced by the invention was fairly uniform and low compared to the two prior art compacts.

3. The abrasive compact of the invention was found to be better than the two prior art compacts in a standard V-notch type toughness test.

4. The compact of the invention was compared to the B prior art compact using a standard thermal dilation test. In this test, the compact layer was removed from the cemented carbide substrate and all residual carbide lapped away. A sample was cut from each compact layer and placed in a dilatometer in an argon atmosphere. The temperature was raised to 750° C. in one test and to 800° C. in the other test and the time measured in hours before permanent expansion was observed. Permanent expansion indicated the onset of graphitisation. The results obtained are set out graphically in FIG. 2. In this figure, permanent expansion is indicated by the dilation factor increasing sharply.

It will be noted that at 800° C., the compact of the invention reached a stage of permanent expansion later than the B compact. At 750° C., no permanent expansion was observed after 45 hours, whereas the B compact exhibited permanent expansion at around 41 hours.

This test illustrates that the compact of the invention has better particle packing and less cobalt pooling than the prior art B compact.

We claim:

1. A method of making an abrasive compact which includes the step of subjecting a mass of ultra-hard abrasive particles to conditions of elevated temperature and pressure suitable for producing an abrasive compact wherein at least 25 percent of the mass of ultra-hard abrasive particles consists of particles having at least three different average particle sizes within an average particle size range of 10 to 100 microns and at least 4 percent of the mass of ultra-hard abrasive particles have an average particle size of less than 10 microns.

2. A method according to claim 1 wherein the mass of ultra-hard abrasive particles having an average particle size in the range 10 to 100 microns has the following distribution:

| Average Particle Size (microns) | % by Mass of the abrasive particle mass |
| --- | --- |
| 25–50 | 30–70 |
| 15–24 | 15–25 |
| 8–14 | 5–15. |

3. A method according to claim 1 wherein the at least 4 percent of the mass of ultra-hard abrasive particles have an average particle size in the range 2 to 5 microns.

4. A method according to claim 1 wherein the at least 4 percent of the mass of ultra-hard abrasive particles are present in an amount of 4 to 12 percent by mass.

5. A method according to claim 1 wherein a binder is caused to infiltrate the mass of ultra-hard abrasive particles when the mass is subjected to the elevated conditions of temperature and pressure.

6. A method according to claim 1 wherein a binder is mixed with the mass of ultra-hard abrasive particles.

7. A method according to claim 5 wherein the binder is a solvent/catalyst for the ultra-hard abrasive particle.

8. A method according to claim 7 wherein the ultra-hard abrasive particle is diamond and the binder is selected from cobalt, nickel, iron and alloys containing one or more of these metals.

9. A method according to claim 1 wherein the mass of ultra-hard abrasive particles is placed on a surface of a cemented carbide body before it is subjected to the elevated temperature and pressure conditions.

10. A method according to claim 1 wherein the elevated temperature and pressure conditions are a pressure in the range 40 to 70 kilobars and a temperature in the range 1300° to 1600° C.

11. A method according to claim 1 wherein the ultra-hard abrasive particles are uncoated.

* * * * *